US012664046B2

(12) United States Patent
Lien et al.

(10) Patent No.: US 12,664,046 B2
(45) Date of Patent: Jun. 23, 2026

(54) BIN-BASED READ ERROR HANDLING FLOWS USING A FAST CORRECTIVE READ OPERATION

(71) Applicant: Micron Technology, Inc., Boise, ID (US)

(72) Inventors: Yu-Chung Lien, San Jose, CA (US); Zhenming Zhou, San Jose, CA (US); Jun Wan, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 58 days.

(21) Appl. No.: 18/779,811

(22) Filed: Jul. 22, 2024

(65) Prior Publication Data

US 2026/0023645 A1    Jan. 22, 2026

(51) Int. Cl.
　　*G06F 11/10*　　　(2006.01)
　　*G06F 11/07*　　　(2006.01)

(52) U.S. Cl.
　　CPC ........ *G06F 11/1016* (2013.01); *G06F 11/076* (2013.01); *G06F 11/1068* (2013.01)

(58) Field of Classification Search
　　CPC . G06F 11/1016; G06F 11/076; G06F 11/1068
　　See application file for complete search history.

(56) References Cited

U.S. PATENT DOCUMENTS

| | | | | |
|---|---|---|---|---|
| 11,175,979 B2 * | 11/2021 | Rayaprolu | ............ | G06F 11/073 |
| 11,314,425 B2 * | 4/2022 | Luo | ..................... | G06F 11/1048 |
| 11,693,745 B2 * | 7/2023 | Liikanen | ............. | G06F 11/2002 |
| | | | | 713/300 |
| 2019/0107972 A1 * | 4/2019 | Lee | ........................ | G06F 3/0679 |
| 2019/0278653 A1 * | 9/2019 | Padilla, Jr. | .......... | G06F 11/0793 |
| 2021/0304837 A1 * | 9/2021 | Kim | ........................ | G11C 29/42 |
| 2022/0164263 A1 * | 5/2022 | Liikanen | ............ | G11C 16/3436 |
| 2022/0301652 A1 * | 9/2022 | Muchherla | ........... | G11C 16/349 |
| 2022/0318086 A1 * | 10/2022 | Muchherla | .......... | G11C 11/5628 |
| 2023/0325273 A1 * | 10/2023 | Muchherla | .......... | G06F 11/0793 |
| | | | | 714/6.11 |
| 2024/0282399 A1 * | 8/2024 | Kim | ................... | G11C 11/5642 |

* cited by examiner

*Primary Examiner* — John J Tabone, Jr.
(74) *Attorney, Agent, or Firm* — Lowenstein Sandler LLP

(57) ABSTRACT

A system comprises a memory device and a processing device, operatively coupled with the memory device. The processing device detects an error during a read operation on a set of target cells of the memory device. The processing device selects, based on a state information bin with which the set of target cells is associated, a read error handling (REH) flow for the set of target cells, wherein the set of target cells is associated with the state information bin based on corresponding cell state information. The processing device executes the REH flow on the set of target cells of the memory device to correct the error.

18 Claims, 6 Drawing Sheets

500

DETECT AN ERROR DURING A READ OPERATION ON A SET OF TARGET CELLS OF THE MEMORY DEVICE 502

SELECT, BASED ON A STATE INFORMATION BIN WITH WHICH THE SET OF TARGET CELLS ARE ASSOCIATED, A READ ERROR HANDLING (REH) FLOW FOR THE SET OF TARGET CELLS 504

EXECUTE THE REH FLOW ON THE SET OF TARGET CELLS OF THE MEMORY DEVICE TO CORRECT THE ERROR 506

BIN-BASED READ ERROR HANDLING FLOWS USING A FAST CORRECTIVE READ OPERATION

TECHNICAL FIELD

Embodiments of the disclosure relate generally to memory sub-systems, and more specifically, relate to bin-based read error handling flows using a fast corrective read operation.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
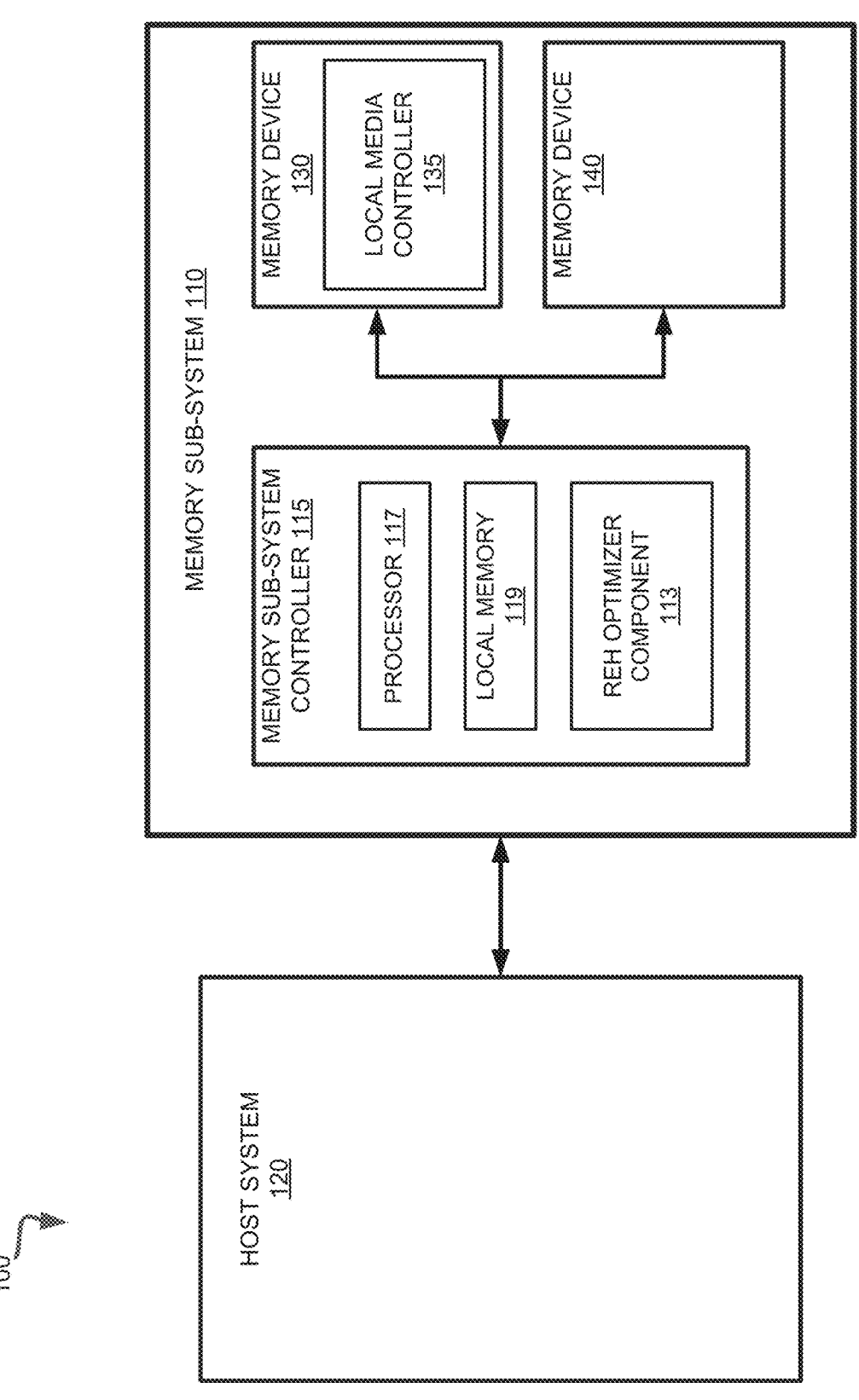
FIG. 1 illustrates an example computing system that includes a memory sub-system in accordance with some embodiments of the present disclosure.

Aspects of the present disclosure are directed to bin-based read error handling flows using a fast corrective read operation. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can have a row of associated memory cells in a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

Various data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error-handling data (e.g., error correction code (ECC) codeword parity data), data version (e.g. used to distinguish age of data written), valid bitmap (which LBAs or logical transfer units contain valid data), etc.

A memory device includes multiple memory cells capable of storing, depending on the memory cell type, one or more bits of information. A memory cell can be programmed (written to) by applying a certain voltage to the memory cell, which results in an electric charge being held by the memory cell known as the "threshold voltage" and denoted as Vt.

A memory device can have distributions that are narrow compared with the working range of control voltages tolerated by the cells of the device. Accordingly, multiple distributions (with "valleys" between distributions) can be fit into the working voltage window allowing storing and reliably detecting multiple bits per cell such as 23=8 distributions (7 valleys) for TLC, $2^2=4$ distributions (3 valleys) for MLC etc. The distributions are interspersed with voltage intervals ("valley margins") between distributions where none (or very few) of the memory cells of the device have their threshold voltages. These valley margins can effectively differentiate various charge states. The logical state of the cell can be ascertained by applying specific read voltages to each valley during a read operation. This effectively allows a single memory cell to store multiple bits of information: a memory cell operated with $2^N$ distributions (which are also called levels) is capable of storing N bits of information. During the read operation, $2^N-1$ read voltages are applied to distinguish $2^N$ distributions. Specifically, the read operation can be performed by comparing the measured threshold voltage $V_T$ exhibited by the memory cell to one or more reference voltage levels corresponding to known valleys (e.g., centers of the valleys) of the memory device.

Due to a phenomenon known as slow charge loss (SCL), the threshold voltage $V_T$ of a memory cell can change with time as the electric charge of the cell is diminishing. This process is sometimes referred to as "temporal voltage shift" (TVS). "Storage charge loss" and "system charge loss" naming is also used for SCL. Since typical cells store negatively charged particles (electrons), the loss of electrons causes the voltage thresholds to shift along the voltage axis towards lower voltage thresholds $V_T$. The threshold voltages can change rapidly at first (immediately after the memory cell is programmed) while slowing down at larger times in an approximately log-linear or power-law fashion ($\Delta V_T$ (t)=$-C*t^b$) with respect to the time t elapsed since the cell programming event. In some embodiments of the present disclosure, TVS can be mitigated by keeping track of the time elapsed since the programming event as well as of the environmental conditions of a particular memory partition (block, plane, etc.) such as temperature and associating a voltage offset $\Delta V_T$ per valley to be used during read operations, where the standard "base read level" threshold voltage $V_T$ (displayed by the cell immediately after programing) is modified by the voltage offset: $V_T \rightarrow V_T + \Delta V_T$ where $\Delta V_T$ is negative due to charge loss. Whereas TVS is a continuous process and compensating for $\Delta V_T(t)$ can be a continuous function of time, adequate accuracy of offsets can be achieved in some embodiments with a discrete number of offset state information bins (hereafter referred to as "bins"). Blocks can be associated with a bin using metadata (e.g., programmed within a specified time window and under similar environmental (e.g., temperature) conditions). Since the time elapsed since programming and temperature conditions are among the main factors affecting the amount of TVS, blocks associated with the same bin can be presumed to exhibit similar distributions of threshold voltages of their memory cells, and thus would require the same voltage offsets to be applied to the base read levels for read operations.

The memory sub-system controller can periodically perform a calibration process in order to associate blocks with one of the bins. Each bin, in turn, can be associated with a set of the voltage offsets to be applied for read operations. The associations of blocks with bins is referred herein as auxiliary read metadata (ARM), which represent a part of broader state metrics of the memory device. The state metrics can also reflect the number of retired physical memory blocks (or other partitions), the number of times various physical blocks have been erased, types of configurations of cells of various memory partitions (e.g., single-level cell vs. multi-level cells), or any other type of information representative of the state of the memory device. The ARM can be stored in metadata tables maintained by the memory sub-system controller.

In accordance with embodiments of the present disclosure, the TVS can be selectively tracked for programmed partitions that are grouped into families. Based on the groupings of partitions into families, appropriate bin-specific read (voltage) offsets are applied to the base read (voltage) levels in read operations. Base read levels can also be stored in the metadata of the memory device. Upon receiving a read command, the memory sub-system controller can identify the family associated with the memory partition identified by the logical address specified in the read command, identify the current bin associated with the identified family, determine a set of read offsets for the identified bin, compute the new read voltages by additively applying the read offsets associated with the identified bin to the base read levels, and perform the read operation using the new read voltage, as described in more detail below.

"Read error" refers to a memory sub-system's failure to validate one or more data items that have been retrieved from a memory device in response to a read command. Read errors can be associated with host-initiated read operations or system-initiated scanning operations and can occur due to, for example, the measured threshold voltage $V_T$ exhibited by the memory cell mismatching with the read voltage levels due to TVS, the requested data being subjected to noise or interference, etc. In a read error, the bit errors in the read data is greater than what the underlying ECC can correct and this results in an ECC failure and accordingly read error. In response to a read error, the memory sub-system can perform a read error-handling (REH) flow in an attempt to recover the data. The REH flow can include one or more REH operations with respect to the data items that have been retrieved from the memory device. An error handling operation can include one or more read retries using different parameters, such as a change in read voltage, as compared to the initial read operation performed on the memory cell. The error-handling operation can also include "deep error handling techniques," such as forward error correction (FEC) with various versions of reliability information, hybrid automatic repeat request (HARQ), etc.

In some implementations, the memory sub-system controller can use a default REH flow in which the REH operations performed during an REH flow remain the same for all blocks of the memory device. For example, upon entering the REH flow, the memory sub-system controller can first perform a set of relatively low latency steps, such as a predetermined amount read retries using varying, relatively small (e.g., not exceeding a predefined threshold) read offsets applied to the base read level. Responsive to the low latency steps successfully recovering the data, the memory sub-system controller can exit the error-handing flow to resume read and write operations. Responsive to the low latency steps failing to recover the data, the memory sub-system controller can perform the next REH operations specified in the REH flow. For example, the memory sub-system controller can perform higher latency steps, such as applying larger read offsets as compared to the read offsets used in the low latency steps, or using deep error-handling techniques (e.g., FEC, HARQ, etc.) to recover the data.

However, REH operations can be time consuming and impact performance of the memory sub-system. The REH operations can result in increased read times and/or degraded performance as observed by the host system. The more frequently one or more REH operations are triggered (e.g., a high trigger rate), the slower the performance of the memory system as fewer read operations and write operations can be performed. In some implementations, this can cause the system to fail or time out.

Memory cells that have been retained the longest are most vulnerable to SCL and the resulting TVS and thus have a greater read error trigger rate than memory cells that have been more recently programmed. As such, memory cells with the longest data retention (which can be associated with specific bins) are a significant threat to performance as the high trigger rate results in high latency due to the repeated use of default (e.g., non-optimized) REH flows.

Aspects of the present disclosure address the above and other deficiencies by having a memory sub-system that can implement different REH flows with a fast corrective read (CR) operation. Specifically, the memory sub-system can select and apply different REH flows, coupled with a fast CR, based on the bin classification of the target cells in the read operation. For example, if a set of memory cells for a read operation is associated with a bin that is associated with recently programmed memory cells, the memory sub-system controller can implement a full "default" REH flow as memory cells associated with that bin are less likely to exhibit TVS and, as such, less likely to have a high read error trigger rate. As such, a default REH flow with higher latency does not affect overall system performance as much as memory cells that exhibit a high read error trigger rate. If a set of memory cells targeted by a read operation is associated with a bin that is associated with cells with longer data retention, the controller can implement a fast CR operation. In some embodiments, the fast CR operation prioritizes efficiency by omitting particular steps that may be found in a typical CR operation. Depending on the magnitude of the risk of TVS, the fast CR operation can be prioritized differently (e.g., the fast CR operation can be performed at different points in relation to other REH flow steps).

Advantages of the present disclosure include, but are not limited to improved REH latency and overall system performance. Implementing different REH flows with variable use of a fast CR operation enhances the performance of the memory sub-system by improving the latency of REH processes. This improves the overall performance of the system. While the embodiments are described using NAND flash memory cells, the principles of the present disclosure can be applied to other types of memory sub-systems.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO- DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc.

The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a REH Optimizer component 113 that can select and apply different REH flows, coupled with a fast CR, determined by the bin classification of the target cells in the read operation. In some embodiments, the memory sub-system controller 115 includes at least a portion of the REH Optimizer component 113. In some embodiments, the REH Optimizer component 113 is part of the host system 120, an application, or an operating system. In other embodiments, local media controller 135 includes at least a portion of REH Optimizer component 113 and is configured to perform the functionality described herein.

The REH Optimizer component 113 can select and apply different REH flows, coupled with a fast CR, based on the bin classification of the target cells in the read operation. For example, if a set of memory cells for a read operation is associated with a bin that is associated with recently programmed memory cells, the memory sub-system controller can implement a "default" REH flow as memory cells associated with that bin are less likely to exhibit TVS and, as a result, are less likely to have a high read error trigger rate. As such, a default REH flow with higher latency does not affect overall system performance as much as memory cells that exhibit a high read error trigger rate. If a set of memory cells targeted by a read operation is associated with a bin that is associated with cells with longer data retention, the controller can implement a fast CR operation to improve latency, taking into account an elevated trigger rate. Depending on the magnitude of the risk of TVS, the fast CR operation can be prioritized differently (e.g., the fast CR operation can be performed at different points in relation to other REH flow steps). Further details with regards to the operations of the REH Optimizer component 113 are described below.

Figure 2:
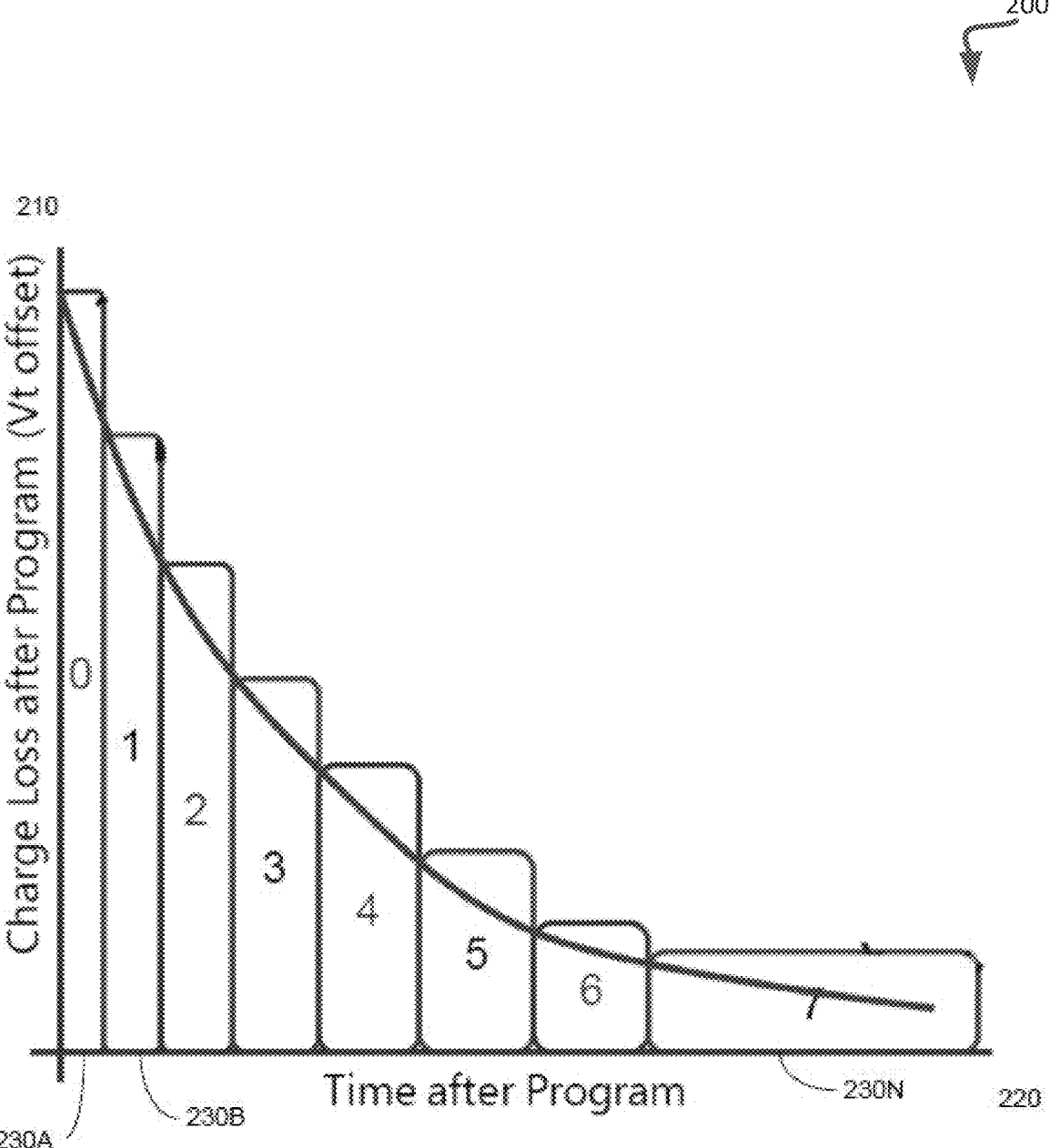
FIG. 2 depicts an example graph illustrating the dependency of the threshold voltage offset on the time elapsed after programming, in accordance with some embodiments of the present disclosure.

FIG. 2 depicts an example graph 200 illustrating the dependency of the threshold voltage offset 210 on the time after program 220 (i.e., the period of time elapsed since the block had been programmed. As schematically illustrated by FIG. 2, blocks of the memory device are grouped into block families 230A-230N, such that each block family includes one or more blocks that have been programmed within a specified time window and a specified temperature window. As noted herein above, since the time elapsed after programming and temperature are the main factors affecting the temporal voltage shift, all blocks and/or partitions within a single block family 210 are presumed to exhibit similar distributions of threshold voltages in memory cells, and thus would require the same voltage offsets for read operations.

Block families can be created asynchronously with respect to block programming events. In an illustrative example, the memory sub-system controller 115 of FIG. 1 can create a new block family whenever a specified period of time (e.g., a predetermined number of minutes) has elapsed since creation of the last block family (e.g., a data retention time) or whenever the reference temperature of memory cells, which is updated at specified time intervals, has changed by more than a specified threshold value since creation of the current block family.

A newly created block family can be associated with bin 0. Then, the memory sub-system controller can periodically perform a calibration process in order to associate each die of every block family with one of the predefined TAP bins (bins 0-7 in the illustrative example of FIG. 2), which is in turn associated with the voltage offset to be applied for read operations. The associations of blocks with block families and block families and dies with TAP bins can be stored in respective metadata tables maintained by the memory sub-system controller.

Figure 3:
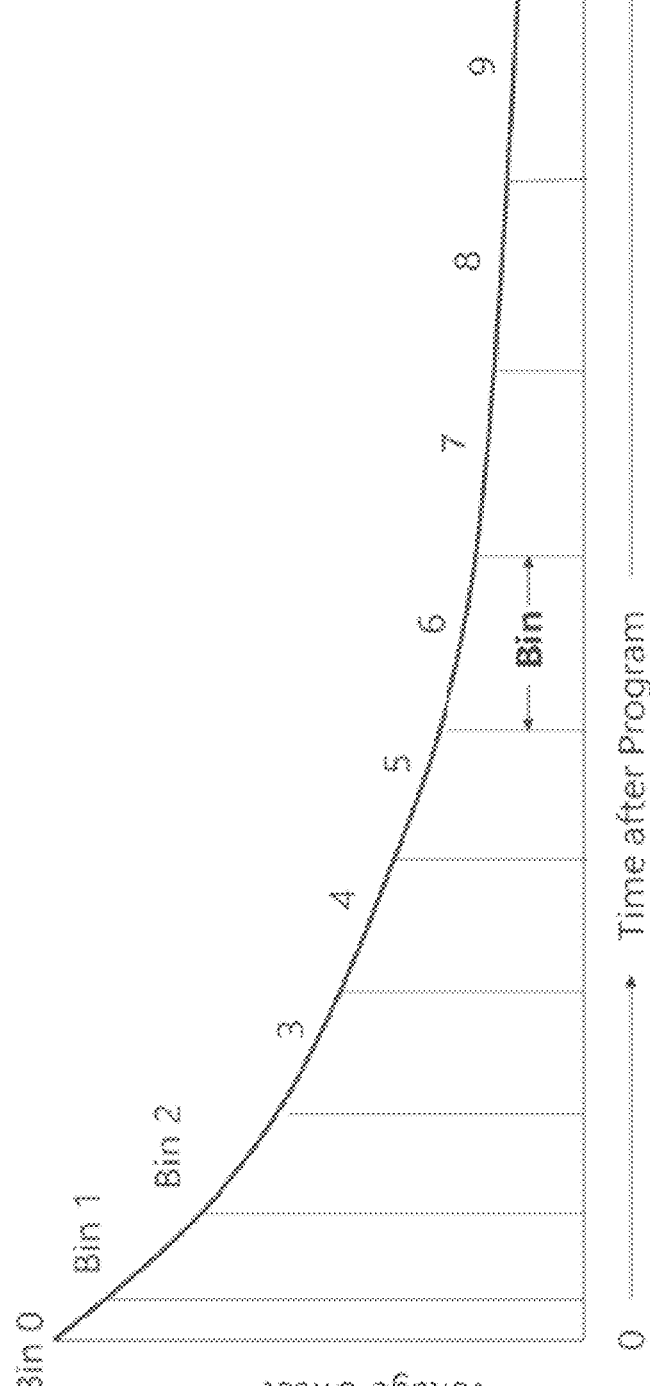
FIG. 3 schematically illustrates a set of predefined time-after-programming (TAP) bins, in accordance with embodiments of the present disclosure.

FIG. 3 schematically illustrates a set of predefined TAP bins (bin 0 to bin 9) in a diagram 300, in accordance with embodiments of the present disclosure. As schematically illustrated by FIG. 3, the threshold voltage offset graph can be subdivided into multiple TAP bins, such that each bin corresponds to a predetermined range of threshold voltage offsets. While the illustrative example of FIG. 4 defines ten bins, in other implementations, various other numbers of bins can be employed (e.g., 64 bins). Based on a periodically performed calibration process, the memory sub-system controller associates each die of every block family with a TAP bin, which defines a set of threshold voltage offsets to be applied to the base voltage read level in order to perform read operations, as described in more detail herein below.

Figure 4:
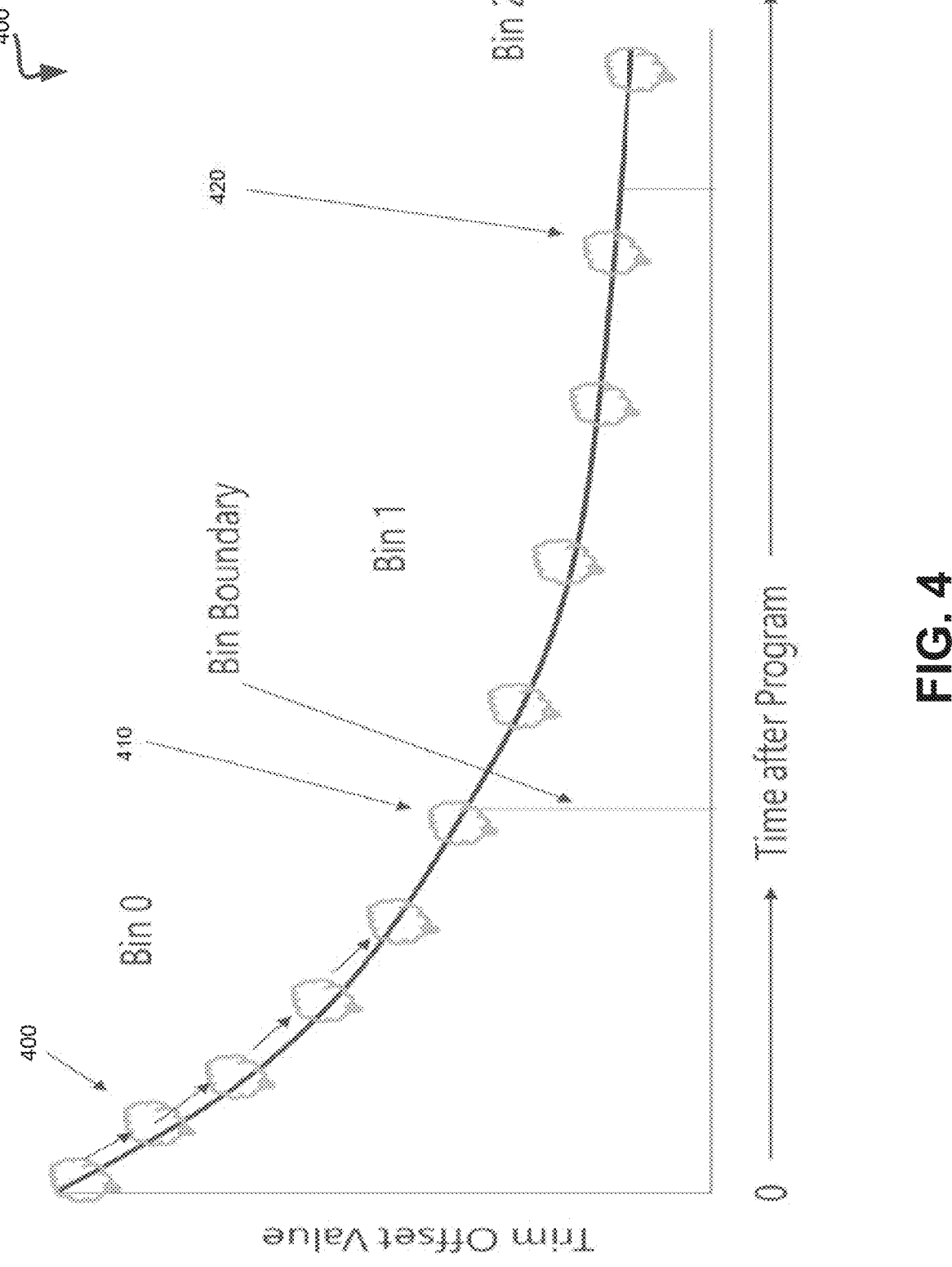
FIG. 4 schematically illustrates selecting block families for calibration, in accordance with embodiments of the present disclosure.

FIG. 4 schematically illustrates selecting block families for calibration in a diagram 400, in accordance with embodiments of the present disclosure. As schematically illustrated by FIG. 4, the memory sub-system controller can limit the calibration operations to the oldest block family in each bin (e.g., block family 410 in bin 0 and block family 420 in bin 1), since it is the oldest block family that will, due to the slow charge loss, migrate to the next bin before any other block family of the current bin.

Figure 5:
FIG. 5 illustrates an example method of selecting a bin-based read error handling (REH) flow, in accordance with embodiments of the present disclosure.
Figure 5:
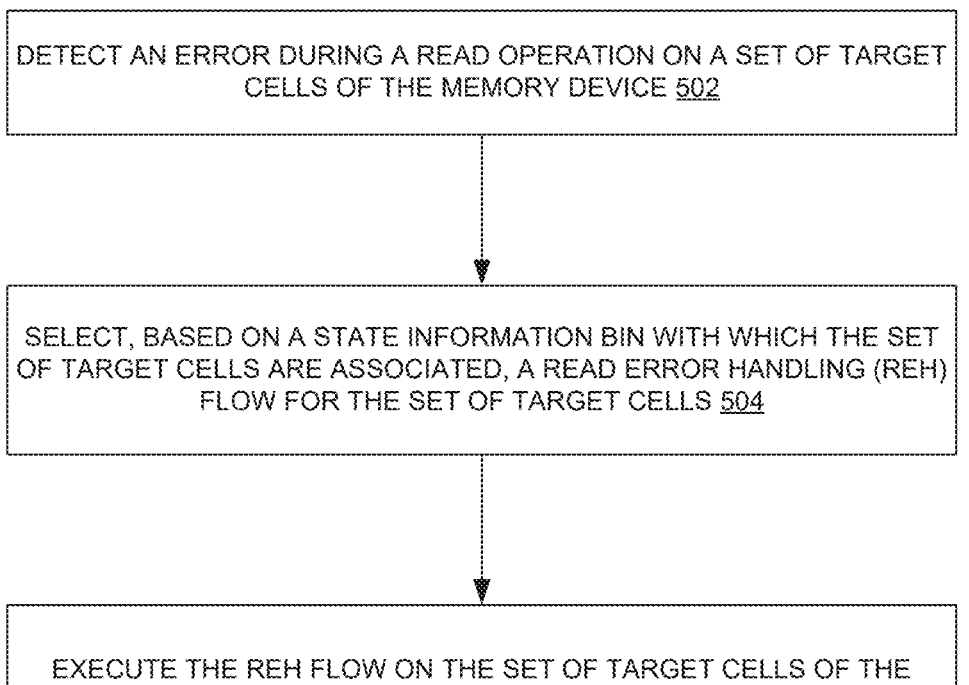

FIG. 5 is a flow diagram of an example method 500 of selecting a bin-based read-error handling (REH) flow, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the REH Optimizer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic (e.g., REH Optimizer component 113) detects an error during a read operation on a set of target cells of the memory device. The set of target cells are memory cells that the processing logic is accessing during the read operation.

At operation 504, the processing logic selects, based on a state information bin with which the set of target cells is associated, an REH flow for the set of target cells. The set of target cells is associated with a state information bin based on corresponding cell state information. As discussed above with FIG. 2, in some embodiments, the corresponding cell state information comprises a data retention time (e.g., the time elapsed since the data was programmed).

In some embodiments, responsive to determining that a first set of target cells having a first cell state information is associated with a first state information bin, the processing logic selects a default REH flow for the first set of target cells, the default REH flow comprising a default set of REH operations. The default REH flow can refer to an REH flow set for each block of the memory-subsystem during programming and/or calibration of the memory sub-system 110, and/or to the REH flow (e.g., F0, F1 . . . F5) initially associated with each bin.

In some embodiments, the first state information bin is one of bins numbered 0-4, the first set of memory cells having a lower data retention time (e.g., time elapsed since programming) than memory cells that are associated with higher numbered bins (e.g., bins 5-7).

In some embodiments, responsive to determining that a second set of target cells having a second cell state information is associated with a second state information bin, the processing logic selects an intermediate REH flow for the second set of target cells. In some embodiments, the intermediate REH flow comprises the processing logic performing a first set of operations to correct the error. In some embodiments, this first set of operations are operations that would typically be performed during the default REH flow. Responsive to the first set of operations failing to correct the error, the processing logic performs a fast CR operation to correct the error. Responsive to the fast CR operation failing to correct the error, the processing logic performs a second set of operations to correct the error. In some embodiments, this second set of operations are operations that would typically be performed during the default REH flow.

In some embodiments, the second state information bin is one of bins numbered 5 or 6, the second set of memory cells having a higher data retention time than memory cells associated with lower numbered bins (e.g., bins 0-4), but a lower data retention time than memory cells that are associated with higher numbered bins (e.g., bin 7). The second set of memory cells can exhibit a higher read error trigger rate than the previously mentioned first set of memory cells associated with the lower numbered first set of bins (e.g., bins 0-4). However, the intermediate REH flow accounts for this elevated trigger rate by improving latency over that of the default REH flow.

In some embodiments, a fast CR can limit operations to improve latency in situations involving memory cells with a higher trigger rate. In some embodiments, a fast CR omits a hit pass voltage phase of a selected wordline (WLn) of the memory device, as well as an equalization phase of a wordline adjacent to the selected wordline (WLn+1).

In some embodiments, the hit pass voltage phase involves applying an optimal pass voltage to the unselected wordlines during a read operation to ensure the accurate sensing of the cells on the selected wordline (WLn), differentiating between programmed and erased states. The fast CR improves latency by omitting this phase.

In some embodiments, the equalization phase involves balancing the voltage levels on adjacent wordlines (such as WLn+1) to reduce interference and stabilize the read operation, ensuring more accurate data retrieval from the selected wordline (WLn). The fast CR improves latency by omitting this phase.

A CR operation is performed to read each target cell using an appropriate read level offset that accounts for the cell-to-cell inference, lateral charge migration and/or intrinsic charge loss caused by the respective group of adjacent cells. In some embodiments, the processing logic performs an initial read on a neighboring word line (WLn+1 or WLn−1), known as the aggressor, to ascertain the charge levels of each cell along the bit line. Cells are categorized into a number of groups depending on the configuration of the memory device. The processing logic performs a read on a target word line (WLn), termed the victim, is read, it undergoes multiple reads at varying read offsets. The cells previously classified into groups are read using their respective, distinct read offsets. The processing logic adjusts the read parameters based on the interference observed from the neighboring word lines.

In some embodiments, the stored cell state information could be 1-bit or 2-bit, dictating whether a 1-bit or 2-bit CR (1BCR or 2BCR) is implemented, respectively. The number of bits determines the configuration and complexity of the CR, with possibilities including single (WLn+1 or WLn−1) or double-sided reads (WLn+1 and WLn−1). In some embodiments, a fast CR is a 1-bit, single-sided CR. The controller assigns each target cell to a bin based on the adjacent cells' states, with each bin corresponding to a specific range of states. Bins are used to categorize cells into sub-distributions for CRs. Based on the configuration (e.g., 1BCR, 2BCR, or 4BCR), bins are assigned specific read level offsets to align the read levels with the observed effects of adjacent cell states on target cells. These offsets are empirically determined and stored in a metadata area of the device. During operation, the controller executes reads on target cells using the determined offsets, aligning each read to the modified central read level appropriate for each bin's target cell VT sub-distribution. This approach ensures the mitigation of interference and accurate data reading.

In some embodiments, responsive to determining that a third set of target cells having a third cell state information is associated with a third state information bin, the processing logic selects a fast REH flow for the third set of target cells, the fast REH flow comprising a fast CR operation. Furthermore, in some embodiments, responsive to the fast CR operation failing to correct the error, the processing logic performs a first set of operations to correct the error. In some embodiments, this first set of operations are operations that would typically be performed during the default REH flow.

In some embodiments, the third state information bin is associated with bin 7, the third set of memory cells having a higher data retention time than memory cells associated with lower numbered bins (e.g., bins 0-6). In embodiments, bins using the fast REH flow have the highest TVS and thus the highest read error trigger rate in comparison to lower numbered bins.

Additionally, in some embodiments, the processing logic obtains a fast CR failure count associated with the third set of target cells of the memory device. In some embodiments, a failure is registered when the number of errors received when performing a read operation exceeds an error correcting capability of an error correcting code (ECC). In some embodiments, the fast CR failure count is obtained in one second intervals by the processing logic. In some embodiments, the fast CR failure count is monitored upon detection of an error during a read operation. In some embodiments, the fast CR failure count is incrementally increased for each read operation failure during the fast CR operation. Responsive to determining that the fast CR failure count satisfies a threshold criterion, the processing logic performs a media management operation on the third set of target cells of the memory device.

Possible media management operations include "folding." Folding is a media management operation performed by the processing logic involving rearranging and consolidating memory segments (for example, implementations using NAND technology can use blocks associated with the third set of target cells) to clear space occupied by "garbage" (invalid) data that is no longer in use. Folding merges smaller memory chunks comprising valid data into larger available blocks to minimize fragmentation and wasted space in the memory device.

In an embodiment implementing a folding operation, the processing logic performs a read operation on the valid data (e.g., up to date, in-use data) from a selected memory segment. The processing logic performs a write operation to write the valid data into the available memory segment. The processing logic performs an erase operation on the selected memory segment.

At operation 506, the processing logic executes the REH flow on the set of target cells of the memory device to correct the error. In some embodiments, the REH flow is executed by the system controller.

Figure 6:
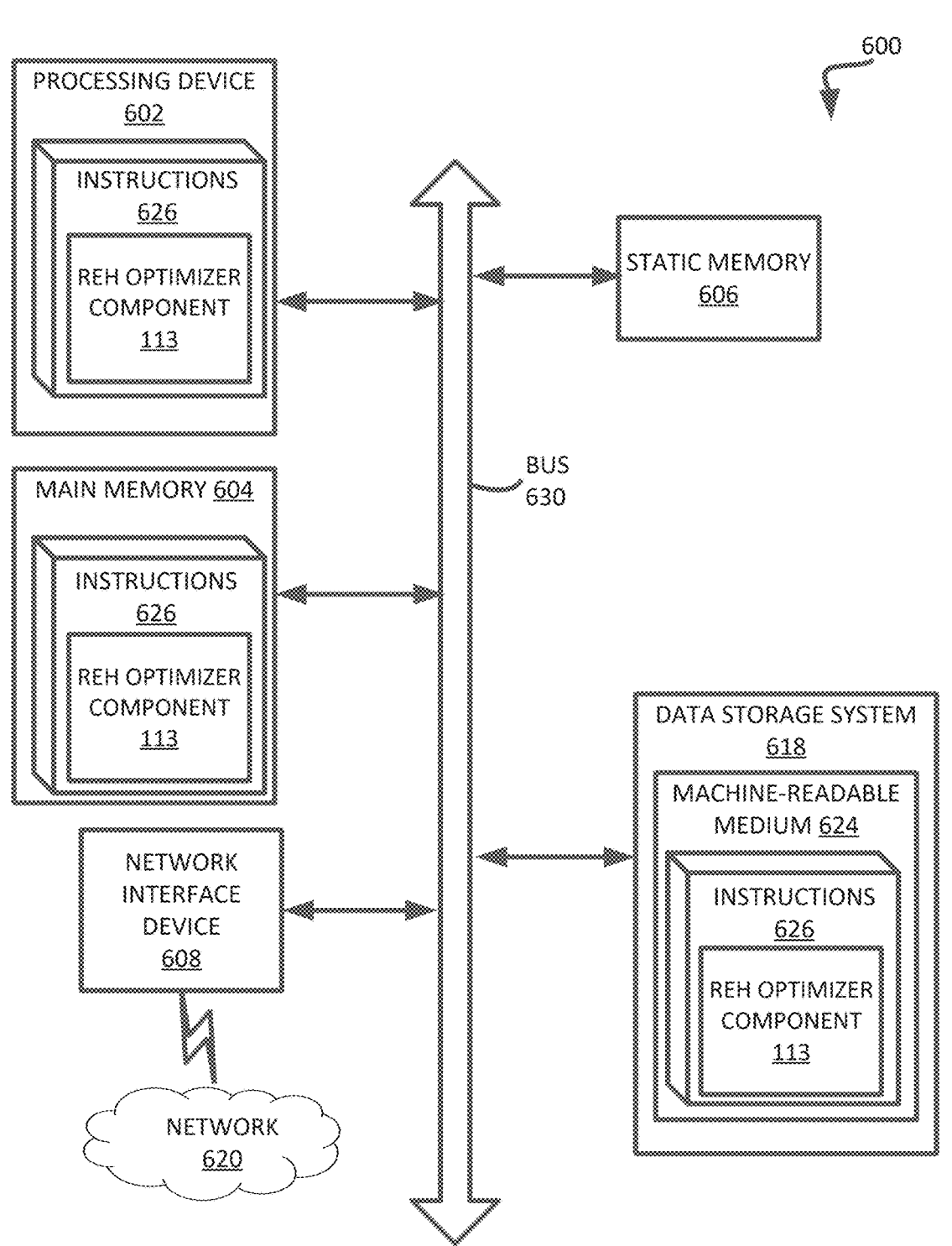
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the REH Optimizer component 113 of FIG. 1). In alternative embodiments, the machine can be connected (e.g., networked) to other machines in a LAN, an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a REH Optimizer component (e.g., the REH Optimizer component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMS, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
detecting an error during a read operation on a set of target cells of the memory device;
selecting, based on a state information bin with which the set of target cells is associated, a read error handling (REH) flow for the set of target cells, wherein the set of target cells is associated with the state information bin based on corresponding cell state information comprising a data retention time of the set of target cells; and
executing the REH flow on the set of target cells of the memory device to correct the error.

2. The system of claim 1, wherein selecting the REH flow for the set of target cells comprises:
responsive to determining that a first set of target cells having a first cell state information is associated with a first state information bin, selecting a default REH flow for the first set of target cells, the default REH flow comprising a default set of REH operations.

3. The system of claim 1, wherein selecting the REH flow for the set of target cells comprises:
responsive to determining that a second set of target cells having a second cell state information is associated with a second state information bin, selecting an intermediate REH flow for the second set of target cells, the intermediate REH flow comprising:
performing a first set of operations to correct the error;
responsive to the first set of operations failing to correct the error, performing a fast corrective read (CR) operation to correct the error; and
responsive to the fast CR operation failing to correct the error, performing a second set of operations to correct the error.

4. The system of claim 1, wherein selecting the REH flow for the set of target cells comprises:
responsive to determining that a third set of target cells having a third cell state information is associated with a third state information bin, selecting a fast REH flow for the third set of target cells, the fast REH flow comprising a fast corrective read (CR) operation.

5. The system of claim 4, wherein the fast CR operation omits:
a hit pass voltage phase of a selected wordline (WLn) of the memory device; and
an equalization phase of a wordline (WLn+1) adjacent to the selected wordline.

6. The system of claim 4, wherein the processing device is to perform operations further comprising:
obtaining a fast CR failure count associated with the third set of target cells of the memory device; and responsive to determining that the fast CR failure count satisfies a threshold criterion, performing a media management operation on the third set of target cells of the memory device.

7. The system of claim 4, wherein to execute the fast REH flow, the processing device is to perform operations further comprising:
responsive to the fast CR operation failing to correct the error, performing a first set of operations to correct the error.

8. A method comprising:
detecting an error during a read operation on a set of target cells of a memory device;
selecting, based on a state information bin with which the set of target cells is associated, a read error handling (REH) flow for the set of target cells, wherein the set of target cells is associated with the state information bin based on corresponding cell state information comprising a data retention time of the set of target cells; and
executing the REH flow on the set of target cells of the memory device to correct the error.

9. The method of claim 8, wherein selecting the REH flow for the set of target cells comprises:
responsive to determining that a first set of target cells having a first cell state information is associated with a first state information bin, selecting a default REH flow for the first set of target cells, the default REH flow comprising a default set of REH operations.

10. The method of claim 8, wherein selecting the REH flow for the set of target cells comprises:
responsive to determining that a second set of target cells having a second cell state information is associated with a second state information bin, selecting an intermediate REH flow for the second set of target cells, the intermediate REH flow comprising:
performing a first set of operations to correct the error;
responsive to the first set of operations failing to correct the error, performing a fast corrective read (CR) operation to correct the error; and
responsive to the fast CR operation failing to correct the error, performing a second set of operations to correct the error.

11. The method of claim 8, wherein selecting the REH flow for the set of target cells comprises:
responsive to determining that a third set of target cells having a third cell state information is associated with a third state information bin, selecting a fast REH flow for the third set of target cells, the fast REH flow comprising a fast corrective read (CR) operation.

12. The method of claim 11, wherein the fast CR operation omits:
a hit pass voltage phase of a selected wordline (WLn) of the memory device; and
an equalization phase of a wordline (WLn+1) adjacent to the selected wordline.

13. The method of claim 11, further comprising:
obtaining a fast CR failure count associated with the third set of target cells of the memory device; and
responsive to determining that the fast CR failure count satisfies a threshold criterion, performing a media management operation on the third set of target cells of the memory device.

14. The method of claim 11, wherein to execute the fast REH flow, further comprising:
responsive to the fast CR operation failing to correct the error, performing a first set of operations to correct the error.

15. A non-transitory computer-readable storage medium comprising instructions that, when executed by a processing device, cause the processing device to perform operations comprising:

detecting an error during a read operation on a set of target cells of a memory device;

selecting, based on a state information bin with which the set of target cells is associated, a read error handling (REH) flow for the set of target cells, wherein the set of target cells is associated with the state information bin based on corresponding cell state information comprising a data retention time of the set of target cells; and executing the REH flow on the set of target cells of the memory device to correct the error.

16. The non-transitory computer-readable storage medium of claim 15, wherein selecting the REH flow for the set of target cells comprises:

responsive to determining that a first set of target cells having a first cell state information is associated with a first state information bin, selecting a default REH flow for the first set of target cells, the default REH flow comprising a default set of REH operations.

17. The non-transitory computer-readable storage medium of claim 15, wherein selecting the REH flow for the set of target cells comprises:

responsive to determining that a second set of target cells having a second cell state information is associated with a second state information bin, selecting an intermediate REH flow for the second set of target cells, the intermediate REH flow comprising:

performing a first set of operations to correct the error;

responsive to the first set of operations failing to correct the error, performing a fast corrective read (CR) operation to correct the error; and responsive to the fast CR operation failing to correct the error, performing a second set of operations to correct the error.

18. The non-transitory computer-readable storage medium of claim 15, wherein selecting the REH flow for the set of target cells comprises:

responsive to determining that a third set of target cells having a third cell state information is associated with a third state information bin, selecting a fast REH flow for the third set of target cells, the fast REH flow comprising a fast corrective read (CR) operation.

\* \* \* \* \*